United States Patent
Copeland et al.

(10) Patent No.: US 10,689,960 B2
(45) Date of Patent: Jun. 23, 2020

(54) FRACTURE NETWORK FLUID FLOW SIMULATION WITH SYSTEMATIC FRACTURE ORIENTATION

(71) Applicant: Halliburton Energy Services, Inc., Houston, TX (US)

(72) Inventors: Dylan Matthew Copeland, Katy, TX (US); Dinesh Ananda Shetty, Sugarland, TX (US); Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 101 days.

(21) Appl. No.: 15/765,534

(22) PCT Filed: Nov. 19, 2015

(86) PCT No.: PCT/US2015/061582
§ 371 (c)(1),
(2) Date: Apr. 3, 2018

(87) PCT Pub. No.: WO2017/086976
PCT Pub. Date: May 26, 2017

(65) Prior Publication Data
US 2019/0078424 A1    Mar. 14, 2019

(51) Int. Cl.
*E21B 43/26*       (2006.01)
*G05B 17/02*       (2006.01)
(Continued)

(52) U.S. Cl.
CPC .............. *E21B 43/26* (2013.01); *E21B 34/06* (2013.01); *E21B 47/06* (2013.01); *G05B 13/04* (2013.01);
(Continued)

(58) Field of Classification Search
CPC ...... E21B 47/06; E21B 41/0092; E21B 47/09; E21B 47/02

See application file for complete search history.

(56) References Cited

U.S. PATENT DOCUMENTS 8,898,044 B2 * 11/2014 Craig .................... E21B 43/16
                                                    703/10
9,103,194 B2 *  8/2015 Khvoenkova ....... E21B 41/0092
(Continued)

FOREIGN PATENT DOCUMENTS

WO    2015117118 A1    8/2015
WO    2017086976 A1    5/2017

*Primary Examiner* — Catherine Loikith
(74) *Attorney, Agent, or Firm* — John W. Wusterberg; Parker Justiss, P.C.

(57) ABSTRACT

An illustrative hydraulic fracturing flow simulation system includes: a data acquisition module collecting measurements from a subterranean formation; a processing module implementing a hydraulic fracturing simulation; and a visualization module that displays a time-dependent spatial distribution. The implemented method includes: modeling a connected network of fractures; assigning an orientation to each fracture in the network to locate two different flow parameter types at each junction, thereby defining an arrangement of different flow parameter types spatially staggered along each fracture; capturing the arrangement as a set of linear equations for iteratively deriving a subsequent flow state from a current flow state; simulating flow through the network of fractures by repeatedly solving the set of linear equations; and determining the time-dependent spatial distribution of at least one flow component.

16 Claims, 3 Drawing Sheets

(51) Int. Cl.
*G06F 30/20* (2020.01)
*E21B 34/06* (2006.01)
*E21B 47/06* (2012.01)
*G05B 13/04* (2006.01)
*G06F 111/10* (2020.01)

(52) U.S. Cl.
CPC .............. *G05B 17/02* (2013.01); *G06F 30/20* (2020.01); *G06F 2111/10* (2020.01)

(56) References Cited

U.S. PATENT DOCUMENTS

| | | |
|---|---|---|
| 9,267,369 B2 * | 2/2016 | Kulkarni .................. E21B 43/26 |
| 10,241,232 B2 * | 3/2019 | Lin ..................... E21B 41/0092 |
| 2012/0158380 A1 | 6/2012 | Hajibeygi et al. |
| 2013/0138406 A1 | 5/2013 | Khvoenkova et al. |
| 2014/0136173 A1 | 5/2014 | Weng et al. |
| 2015/0051878 A1 | 2/2015 | Kulkarni et al. |

\* cited by examiner

FRACTURE NETWORK FLUID FLOW SIMULATION WITH SYSTEMATIC FRACTURE ORIENTATION

CROSS-REFERENCE TO RELATED APPLICATION

This application is the National Stage of, and therefore claims the benefit of, International Application No. PCT/US2015/061582 filed on Nov. 19, 2015, entitled "FRACTURE NETWORK FLUID FLOW SIMULATION WITH SYSTEMATIC FRACTURE ORIENTATION," which was published in English under International Publication Number WO 2017/086976 on May 26, 2017. The above application is commonly assigned with this National Stage application and is incorporated herein by reference in its entirety.

BACKGROUND

Unconventional reservoirs often have a low-permeability rock matrix that impedes fluid flow, making it difficult to extract hydrocarbons (or other fluids of interest) at commercially-feasible rates and volumes. Fortunately, the effective permeability of the formation can be increased by hydraulic fracturing. When the rock matrix is exposed to a high-pressure high-volume flow of a relatively incompressible fluid, the low permeability causes sharp gradients in the formation's stress field, forcing integrity failures at the relatively weakest points of the rock matrix. Such failures often occur as sudden "cracking" or fracturing of the matrix that momentarily reduces the stress gradient until it can be rebuilt by the intruding fluid flow. As the high-pressure flow continues, the fractures may propagate, for example, as an intermittent series of small cracks. The injected fluid also deforms and shifts blocks of matrix material, further complicating the fracture propagation analysis.

Accordingly, accurate modeling of the hydraulic fracturing operation requires that fluid flow phenomena be taken into account. However, the computation resources available for modeling are typically limited and the challenge is to maximize the accuracy and efficiency of the modeling process within these constraints, and to ensure that the accuracy is sufficient to guide oilfield operators.

Oilfield operators generally desire to provide a relatively even distribution of fractures throughout the reservoir while avoiding overlap in the fractures connecting to different wells or different production zones in a single well. (Such overlaps prevent operators from applying a pressure differential across the region between the overlapping fracture families, dramatically reducing the rate and efficiency at which fluid can be drained from that region. Conversely, an uneven distribution of fractures leaves regions of low permeability that similarly cannot be drained effectively.) Thus, operators seek to induce fracturing with carefully controlled fracture reach ("extent"). Inaccuracies in predicting and controlling fracture extent significantly impair the efficiency and rate at which fluids can be recovered from the formation.

BRIEF DESCRIPTION OF THE DRAWINGS

Accordingly, the drawings and the following description disclose simulation systems and methods that model hydraulic fracture flows using systematic fracture orientation. Such systematic orientation enables increased efficiency without any sacrifice to accuracy. In the drawings.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Figure 1:
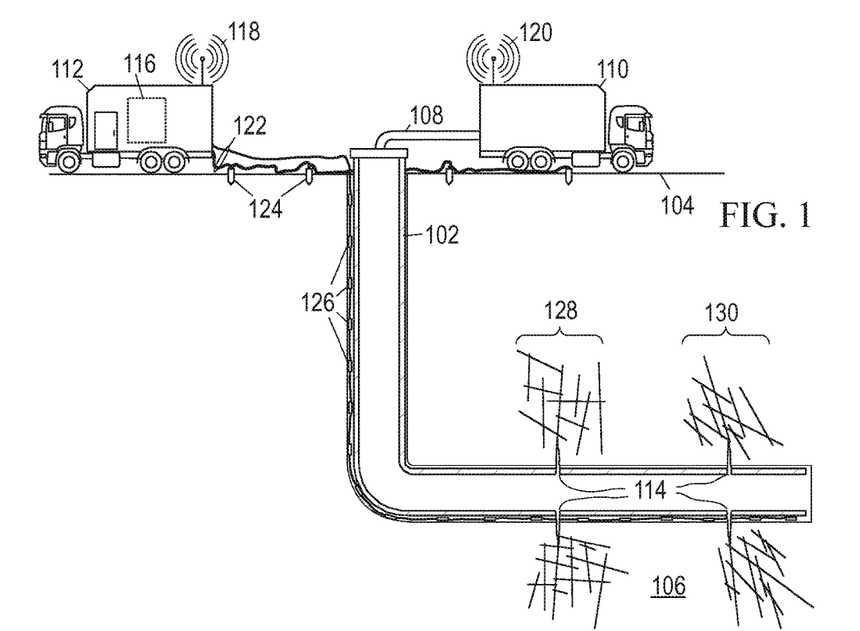
FIG. 1 is an environmental view of an illustrative hydraulic fracturing operation.

We begin here with a discussion of an illustrative hydraulic fracturing operation to which the disclosed systems and methods have been applied. FIG. 1 shows the environment of an illustrative hydraulic fracturing operation. A wellbore 102 extends from the surface 104 into a subterranean region 106. Typically, the subterranean region includes a reservoir that contains hydrocarbons or other resources such as, e.g., shale, coal, sandstone, granite, or other rocks with pores containing oil or natural gas. The subterranean region 106 may include naturally fractured rock or natural rock formations that are not fractured to any significant degree. When the subterranean region 106 includes tight gas formations (i.e., natural gas trapped in low permeability rock such as shale), it is typically desirable to create additional fractures in the formation to increase the formation's effective permeability.

Accordingly, FIG. 1 also shows an injection assembly coupled to supply a high-pressure, high-volume fluid flow via a conduit 108 to the wellbore 102. The injection assembly includes one or more pump trucks 110 and instrument trucks 112 that operate to inject fluid via the conduit 108 and the wellbore 102 into the subterranean region 106, thereby opening existing fractures and creating new fractures. The fluid reaches the formation via one or more fluid injection locations 114, which in many cases are perforations in the casing of wellbore 102. Such casing may be cemented to the wall of the wellbore 102, though this is not a requirement. In some implementations, all or a portion of the wellbore 102 may be left open, i.e., without casing. The conduit 108 may include an injection manifold and feed pipe, as well as piping internal to the wellbore such as a work string, coiled tubing, sectioned pipe, or other types of conduit.

The fracture treatment may employ a single injection of fluid to one or more fluid injection locations 114, or it may employ multiple such injections, optionally with different fluids. Where multiple fluid injection locations 114 are employed, they can be stimulated to concurrently or in stages. Moreover, they need not be located within the same wellbore 102, but may for example be distributed across multiple wells or multiple laterals within a well. An injection treatment control system 116 coordinates operation of the injection assembly components (pump trucks, feed tanks, throttles, valves, flow sensors, pressure sensors, etc.) to monitor and control the fracture treatment. Though shown as being localized to a single instrument truck 112, the control system 116 may in practice take the form of multiple data acquisition and processing systems optionally distributed throughout the injection assembly and wellbore 102, as well as remotely-coupled offsite computing facilities available via communication links and networks. Though the computing system is described below as a separate entity for implementing hydraulic fracture modeling, some contemplated embodiments of the injection treatment control system 116 have the simulator as an integrated component.

The pump trucks 110 can include mobile vehicles, immobile installations, skids, hoses, tubes, fluid tanks, fluid reservoirs, pumps, valves, mixers, or other types of structures and equipment. They supply treatment fluid and other materials (e.g., proppants, cross linked gels, linear gels, surfactants, breakers, stop-loss materials) for the injection treatment. The illustrated pump trucks 110 communicate treatment fluids into the wellbore 102 at or near the level of the ground surface 104. The pump trucks 110 are coupled to valves and pump controls for starting, monitoring, stopping, increasing, decreasing or otherwise controlling pumping as well as controls for selecting or otherwise controlling fluids pumped during the injection treatment.

The instrument trucks 112 can include mobile vehicles, immobile installations, or other suitable structures and sensors for measuring temperatures, pressures, flow rates, and other treatment and production parameters. The example instrument trucks 112 shown in FIG. 1 include an injection treatment control system 116 that controls or monitors the injection treatment applied by the injection assembly. The injection assembly may inject fluid into the formation above, at, or below a fracture initiation pressure; above, at, or below a fracture closure pressure; or at another fluid pressure.

Communication links 118, 120 enable the instrument trucks 112 to communicate with the pump trucks 110 and other equipment at the ground surface 104. Additional communication links 122 enable the instrument trucks 112 to communicate with sensors or data collection apparatus in the wellbore 102, other wellbores, remote facilities, and other devices and equipment. The communication links can include wired or wireless communications assemblies, or a combination thereof. FIG. 1 shows communication links 122 for an array of surface seismic sensors 124 and an array of downhole seismic sensors 126 for detecting and locating microseismic events. Though downhole sensors 126 are shown as being positioned in the injection well, they can also or alternatively be located in one or more nearby monitoring wells. Sensors 124 and/or 126 detect seismic energy from the microseismic events that occur as fractures are formed and propagated. The received energy signals from the sensors are processed by the control system 116 to determine the microseismic event locations, times, and magnitudes. As discussed further below, such information is indicative of the fracture locations and dimensions, which information may be used to determine when the fracturing operations should be terminated and how to carry out subsequent operations to achieve the desired results.

The injection treatment control system 116 may include data processing equipment, communication equipment, and other equipment for monitoring and controlling injection treatments applied to the subterranean region 106 through the wellbore 102. The injection treatment control system 116 may be communicably linked to a remote computing facility that can calculate, select, or optimize treatment parameters for initiating, opening, and propagating fractures of the desired extent. The injection treatment control system 116 may receive, generate or modify an injection treatment plan (e.g., a pumping schedule) that specifies properties of an injection treatment to be applied to the subterranean region 106. Based on such modeled behavior results, the injection treatment control system 116 shown in FIG. 1 controls operation of the injection assembly to optimize fluid compositions, flow rates, total flow volumes, injection pressure, and shut-in intervals.

FIG. 1 shows that an injection treatment has fractured the subterranean region 106, producing first and second fracture families 128, 130 from respective perforations 114. The induced fractures may extend through naturally fractured rock, regions of un-fractured rock, or both. The injected fracturing fluid can flow from the induced fractures into the natural fracture networks, into the rock matrix, or into other locations in the subterranean region 106 (e.g., faults, voids). The injected fracturing fluid can, in some instances, dilate or propagate the natural fractures or other pre-existing fractures in the rock formation. The formation and propagation of fractures produces microseismic events, which may be identified and located based on analysis of the signals from sensors 124 and 126. The progression of the fracturing operation can thus be monitored and such monitoring used to derive information useful for modeling the fracture networks that have been formed and which may be formed in future fracturing operations in the region.

In some implementations, the control system 116 collects and analyzes the signals from sensors 124, 126 to map fractures, monitor the spatial distribution of injected fluids, and to control the fluid injection parameters to bring the achieved fracture extent as close as possible to a target value. For example, the injection treatment control system 116 can modify, update, or generate a fracture treatment plan (pumping rates, pressures, fluid compositions) based on the estimated spatial distributions of various fluid components derived from microseismic monitoring of the ongoing treatment, where it becomes imperative to employ highly efficient computational algorithms that deliver high fidelity results with minimal consumption of computation resources, i.e., CPU time and memory requirements. As another example, fracture flow parameters derived from previous fracturing operations may enable predictions of fracture flow properties based on a proposed pumping schedule or other aspects of a formation treatment plan for subsequent operations in the field.

Some of the techniques and operations described herein may be implemented by one or more computing assemblies configured to provide the functionality described. In various instances, a computing assembly may include any of various types of devices, including, but not limited to, handheld mobile devices, tablets, notebooks, laptops, desktop computers, workstations, mainframes, distributed computing networks, and virtual (cloud) computing systems.

Figure 2:
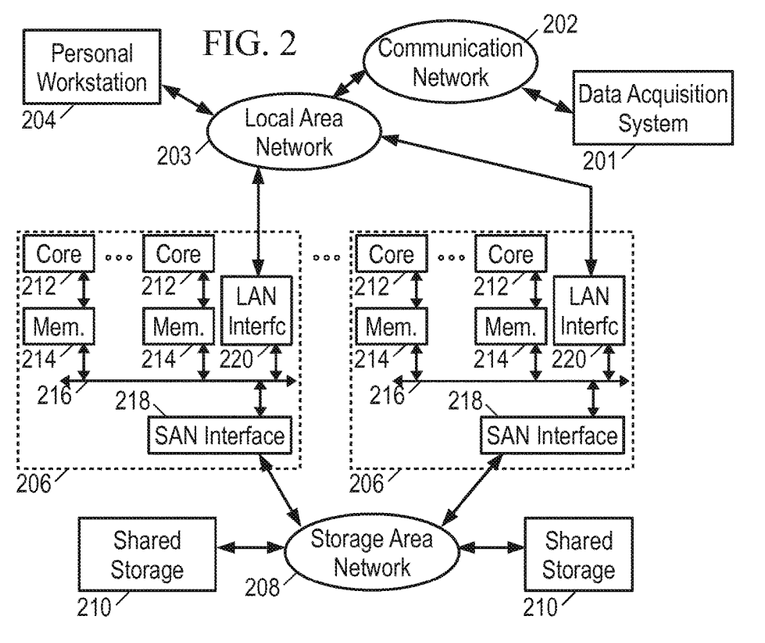
FIG. 2 is a block diagram of an illustrative hydraulic fracture modeling system.

FIG. 2 shows an illustrative computing system in which a data acquisition system 201 represents the instrument trucks 112 and other sources of data regarding the well and surrounding formations. A communications network 202 (such as, e.g., the internet or other communications link for transferring digital data) couples the data acquisition system 201 to a local area network (LAN) 203 to communicate the data to a personal workstation 204. The data can include treatment data, geological data, fracture data, fluid data, or other types of data. Workstation 204 may take the form of a desktop computer having a user interface (e.g., keyboard, mouse, and display) that enables the user to interact with the other elements of the computing system, e.g., by entering commands and viewing responses. In this fashion, the user is able to retrieve the well data and make it available for simulation of flow in a network of fractures.

Workstation 204 may lack sufficient internal resources to perform such processing in a timely fashion for complex fracture networks. The LAN 203 further couples the workstation 204 to one or more multi-processor computers 206, which are in turn coupled via a storage area network (SAN) 208 to one or more shared storage units 210. LAN 203 provides high-speed communication between multi-processor computers 206 and with personal workstation 204. The LAN 204 may take the form of an Ethernet network.

Multi-processor computer(s) 206 provide parallel processing capability to enable suitably prompt processing of the microseismic and fracture growth modeling data. Each computer 206 includes multiple processors 212, distributed memory 214, an internal bus 216, a SAN interface 218, and a LAN interface 220. Each processor 212 operates on allocated tasks to solve a portion of the overall problem and contribute to at least a portion of the overall results. Associated with each processor 212 is a distributed memory module 214 that stores application software and a working data set for the processor's use. Internal bus 216 provides inter-processor communication and communication to the SAN or LAN networks via the corresponding interfaces 218, 220. Communication between processors in different computers 206 can be provided by LAN 204 or via a mailbox mechanism on storage devices 210.

SAN 208 provides low-latency access to shared storage devices 210. The SAN 208 may take the form of, e.g., a Fibrechannel or Infiniband network. Shared storage units 210 may be large, stand-alone information storage units that employ magnetic disk media for nonvolatile data storage. Other suitable forms of nontransitory information storage media can also be employed. To improve data access speed and reliability, the shared storage units 210 may be configured as a redundant disk array ("RAID").

It is the software that configures the various parts of the computing system to coordinate and collectively operate as a hydraulic fracture modeling system. One or more commercially available software packages and libraries may be installed in the computer assembly to provide the functionality for solving linear systems. User-authored programs, functions, scripts, workflows, or other programming mechanisms may be employed to customize the operation of the software and automate certain operations such as those outlined below for formulating reservoir formation models and simulating fracture propagation. The applications software may include a fracture mapping module, mesh fitting module, an equation construction module, an equation solving module, a user interface module, and other function modules, each implemented in the form of machine-readable instructions. Examples of commercially available software that support the use of such programming include C, C++, C++ AMP, D, Erlang, Python and Fortran. The computing system can be preprogrammed or can be programmed (and reprogrammed) by loading a program from another source (e.g., from a CD-ROM, from another computer device through a data network, or in another manner). Nevertheless, the implementation of the following methods is not limited to any specific software language or execution environment.

Figure 3:
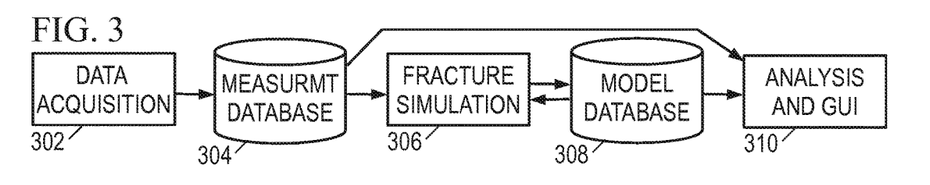
FIG. 3 is a diagram of an illustrative modeling software architecture.

The software operating on the computing system may be structured as indicated by the software architecture shown in FIG. 3. A data acquisition module 302 stores various types of data in a measurement database 304. The measurement database may include treatment data relating to injection treatment plans. For example the treatment data can indicate a pumping schedule, parameters of a previous injection treatment, parameters of a future injection treatment, or parameters of a proposed injection treatment. Such parameters may include information on flow rates, flow volumes, slurry concentrations, fluid compositions, injection locations, injection times, or other parameters.

The measurement database may further include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, natural fracture geometries, or other attributes of one or more rock formations in the subterranean zone. The geological data can include information collected from well logs, rock samples, outcroppings, microseismic imaging, tilt measurements, or other data sources.

The measurement database may still further include fluid data relating to well fluids and entrained materials. The fluid data may identify types of fluids, fluid properties, thermodynamic conditions, and other information related to well assembly fluids. The fluid data can include flow models for compressible or incompressible fluid flow. For example, the fluid data can include coefficients for systems of governing equations (e.g., Navier-Stokes equations, advection-diffusion equations, continuity equations, etc.) that represent fluid flow generally or fluid flow under certain types of conditions. In some cases, the governing flow equations define a nonlinear system of equations. The fluid data can include data related to native fluids that naturally reside in a subterranean region, treatment fluids to be injected into the subterranean region, hydraulic fluids that operate well assembly tools, or other fluids that may or may not be related to a well assembly.

Simulation software 306 (including the fracture mapping, orientation assignment, flow discretization, equation construction, and solving modules) employs the information from the measurement database 304 to locate and model the flow of fluids along hydraulically induced fractures. The fracture and fluid properties are stored in model database 308. The fracture and fluid properties may include time-dependent spatial distribution of fluid flow parameters as discussed further below. A visualization and analysis module 310 generates visual representations of the fractures and flow properties for an operator, generally in an interactive form that enables the operator to enhance portions of the model and derive analytical results therefrom. The visual representation may depict spatial distributions of values and/or integrated values such as injected volumes, flow rates, fracture dimensions, and estimated permeabilities. In some contemplated embodiments, the analysis module further produces recommendations for real-time modifications to treatment plans that are underway.

We turn now to a discussion of certain fracture network modeling details. The hydraulic fracturing operations produce complex fracture networks that pose steep requirements for computationally modeling physical phenomena (such as crack propagation and fluid-structure interactions) to the desired accuracy. One of the challenges associated with developing computational models is discretization of the spatial domain where the computer accounts for and distinguishes between the fluid and solid regions, which vary with respect to time.

Figure 4A:
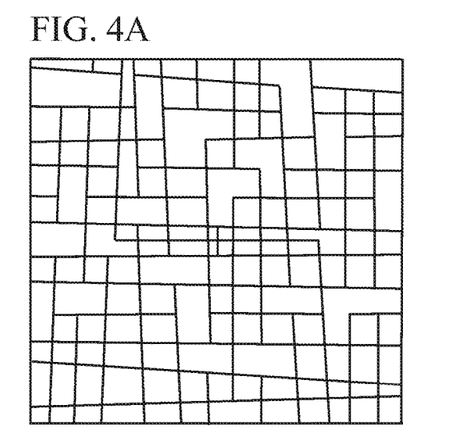
FIGS. 4A-4B are mesh representations of a fracture network.
Figure 4B:
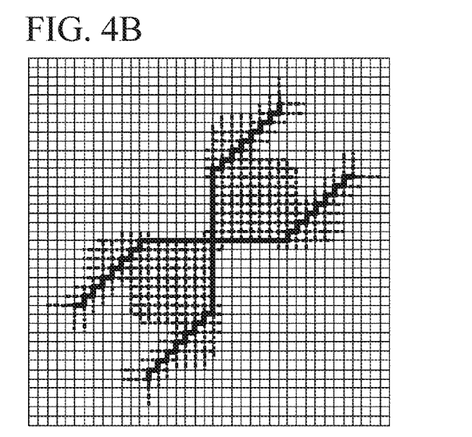

One approach disclosed by Bai and Lin in "Tightly coupled fluid-structure interaction computation algorithm for hydraulic fracturing simulations", 48$^{th}$ US Rock Mechanics Symposium Minneapolis, 2014 (ARMA 14-7258), models the fracture network using a predetermined mesh as shown in FIG. 4A. The faces of the mesh correspond to the rock, while the edges correspond to the (potential) fractures. As the fluid mechanics are simulated in the presence of a rock stress distribution, the fluid initiates, opens, and/or extends fractures along the predefined edges of the mesh. The mesh is static, meaning that the simulation software inherently constrains the directions and rates of fracture propagation. Where more flexibility is desired for the fracture network, a finer, regular mesh may be employed as indicated in FIG. 4B (also drawn from Bai and Lin). Heavy solid lines represent four primary fracture paths emanating outward from a central injection point. The primary fracture paths result from tensile failure, while heavy broken lines represent the secondary network of fracture paths formed by shear failure. In either case, the computer system must simulate flow along a sizeable number of interconnected fluid flow paths.

Figure 5A:
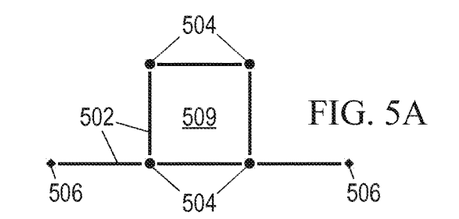
FIG. 5A is a node model diagram of an illustrative fracture network.

FIG. 5A presents an illustrative discrete flow-field network as an example of how the fracture network flow may be modeled. The discrete flow-field network is a collection of connected flow paths 502 (representing, e.g., tubes or slots) directly coupled to each other at intersections (hereafter termed "junctions") 504. The network may also include one or more source and sink nodes 506. In at least some embodiments, the discrete flow-field network further includes indirect connections through the wall interaction, for example, a fracture network where the movement of surface of a fracture can influence fluid behavior in some other fracture sharing the same rock block 509. In general, the flow network can be represented using "graph" where the edge represents a flow-path 502 and the "vertex" represents a junction 504 or source/sink node 506.

The simplest models used for simulating fracture flows are one dimensional Darcy flow or the Reynolds approximation to the Navier-Stokes equations. Describing the fluid flow using the Navier-Stokes equations under general conditions are physically more correct and accurate, and may be preferred. Without loss of generality we shall consider a one-dimensional version of the incompressible Navier-Stokes equations, but the orientation methods described below are applicable for any variation of the Navier-Stokes equations as applied to a discrete flow-field network.

The 1D Navier-Stokes equations for fracture flows are:

$$A_t + Q_x + Q_{rsr} = 0$$

$$Q_t + (Q^2/A)_x + AP_x - \mu Q_{xx} + FM = 0$$

where Q is the volume flow rate, P is the pressure, A is the fracture aperture, x and t subscripts represent differentiation with respect to space and time variables, $Q_{rsr}$ is the leak-off/flow-back volume rate, and FM is an appropriate friction model. The first equation is the continuity equation and the second equation is the momentum equation. A relationship between pressure and aperture area should also be included and may be derived from modeling of deformation and displacement of the solid rock blocks 509.

Figure 5B:
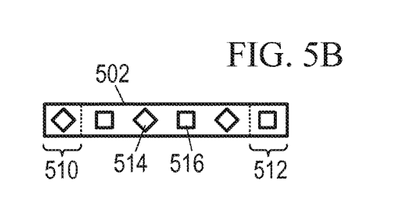
FIG. 5B is diagram of a fracture with spatially staggered flow parameters.

One technique for ensuring that the equations will provide a stable, momentum-conserving solution along a given flow path is to employ offset-discretization of the different parameter types, e.g., offsetting the discretization of flow rate Q from the discretization of pressure P and aperture A. FIG. 5B shows an illustrative fracture or flow path 502 having an even distribution of discretization points 514, 516 between its two ends 510, 512. Two types of discretization points 514, 516 are provided, with one type (marked with diamonds) representing the points 514 at which the flow rate Q is evaluated and the other type (marked with squares) representing the points 516 where the pressure P and aperture A are evaluated. The two types are interleaved, resulting in offset discretization points arranged in a pair-wise fashion. Three of each type are shown in FIG. 5B, but a greater number may be used.

The pair-wise arrangement necessarily results in each edge having ends of different types. End 510 has the Q-type discretization point and hence coincides with a point where the flow rate Q is evaluated. End 512 has the P-type discretization point and hence coincides with a point where the pressure P and aperture A are evaluated. Because the ends have different types, the edge is oriented. The orientation is largely arbitrary, as the solution along any given flow path will be unchanged by a reversal of the orientation. As explained below, this circumstance presents an opportunity.

Figure 5C:
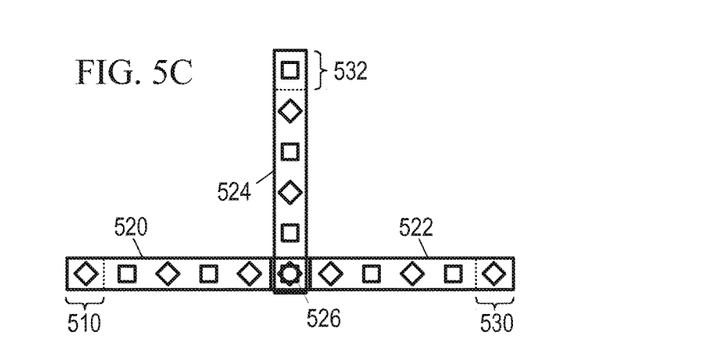
FIG. 5C is a diagram of an illustrative junction between fractures with staggered flow parameters.

The offset discretization is advantageous for unbranching flow paths. However, to enforce momentum-conservation at junctions where the flows may split or converge, it is desirable to determine notionally-collocated Q, P, and A parameters. More specifically, orientations are selected to provide each junction with at least one Q-type end of an edge and at least one P-type end of an edge. Thus, in the example of FIG. 5C, flow paths 520, 522, and 524 emanate from a junction 526. Junction 526 has collocated Q-type and P-type parameters, the P-type parameter provided by flow paths 520 and 522, and the Q-type provided by flow path 524. Ends 510, 530, and 532 provide complementary parameters to the junctions to which they connect.

Figure 6A:
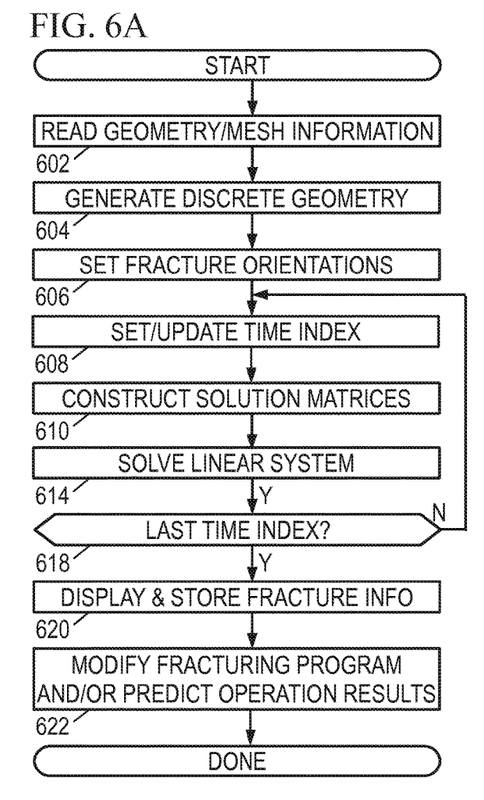
FIGS. 6A-6B are flow diagrams of an illustrative fracture flow simulation method.
Figure 6B:
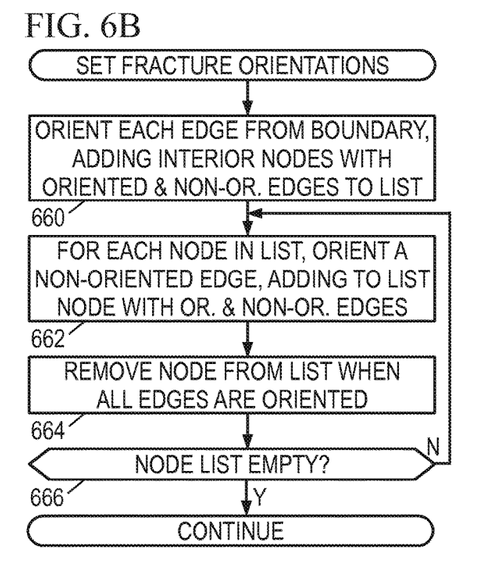

Accordingly, the illustrative fracture flow simulation method of FIGS. 6A-6B includes a process for systematically assigning an orientation to each fracture in the network, to ensure each junction is connected to at least one fracture by a Q-type discretization point and at least one fracture by a P-type discretization point.

The fracture network is modeled as a graph of vertices (fluid junctions) and edges (one-dimensional fractures or fluid flow paths). The data structure for the graph may include a list of vertices, with each vertex having an associated list of the edges connecting to it. A vertex is considered to be interior if it connects at least two edges. Otherwise, it is an endpoint vertex. A boundary vertex is defined as a vertex where the parameter values are known (input) values. The graph is assumed to have at least one boundary vertex, though there may be more depending on the geometry of the problem and type of the equations being solved. The following procedure yields orientations for each fracture:

Set the orientation of all edges having a boundary vertex, depending on the type of boundary condition imposed (i.e., if the boundary provides known flow rate Q values, assign Q-type end, otherwise assign P-type). The opposite end of the edge is thereby also determined. "Mark" the edge as complete.

Loop over the vertices that have at least one "marked" and one "unmarked" edge. If no such junction was found, terminate (all edges are "marked" due to the connected nature of the graph).

Pick any "unmarked" edge from the selected vertex as a candidate for marking and make end the opposite type of that for any "marked" edge from the same junction. "Mark" the candidate edge as complete.

Examine the vertex at the other end of the marked candidate edge, searching for an unmarked neighboring edge. If found, make this the candidate edge & repeat previous step. Otherwise, return to Loop step.

The last two steps mark edges along a contiguous path, and the loop guarantees that all edges will be marked with some orientation, will satisfy the desired property of having collocated parameters of different types at each junction.

It should be noted that due to arbitrary ordering of the nodes and edges, the foregoing procedure can provide multiple solutions, but each solution will have the same number of variables and the Navier-Stokes equation solution is insensitive to the edge orientations. The algorithmic complexity of this procedure is linear with respect to the number of edges and the number of closed loops present in the graph representation of the network.

In view of the foregoing principles and techniques, FIGS. 6A-6B present an illustrative hydraulic fracture flow simulation method that may be implemented in large part by the previously described computing systems. Though the operations of the method are shown and described as being sequential, in practice the operations are expected to occur concurrently and with potentially different orders.

The method begins in block 602 with the simulator module reading the information regarding the spatial properties of the region to be simulated, including formation layering, well positioning, fracture modeling, treatment planning, and any acquired measurements suitable for setting boundary conditions. In block 604, the simulator module discretizes the volume and fracture geometry to generate a graph representation of the fracture network, with edges representing fractures and vertices representing junctions. In block 606, the simulator module systematically assigns an orientation to each edge in the graph, collocating dissimilar flow parameter types at the junctions to minimize the number of simulation variables. The simulator then initializes a time index for the flow simulation in block 608, and updates it each time the loop (blocks 608-618) is repeated.

In block 610, the simulator module constructs a set of sparse matrices representing the relationships between the system elements and expressing the subsequent state of the system in terms of the current state. Depending on the model structure, the sparse matrices may embody a connection graph in which the graph nodes may represent positions along the fracture paths, formation blocks, and model boundaries of the deformed mesh, while the graph edges represent the interactions (multi-phase mass flows, heat flows, and forces) between the graph nodes. As blocks deform and fractures propagate, the connection graph may change, along with the various parameters representing the time-dependent state of the system, necessitating that the matrices be updated. For guidance on deriving the model and linear equations from the discretized volume and fracture network graph representation, see Bai and Lin, "Tightly coupled fluid-structure interaction computation algorithm for hydraulic fracturing simulations", $48^{th}$ US Rock Mechanics Symposium Minneapolis, 2014 (ARMA 14-7258). Other model structures may alternatively be employed.

In block 614 the simulator module solves the linear system of equations embodied by the sparse matrices. The information obtained from the solution enables the simulation module to determine the time-dependent spatial distribution of fluid components and flow parameters. This new distribution will be employed for simulating the next time step. In block 618, the simulator module determines whether the last time step has been reached, and if not, blocks 608-618 are repeated to move the simulation forward. After completion, the time-dependent spatial distributions of fluids and flow parameters are stored in block 620 and displayed by the visualization module. In block 622, the results are used as a basis for predicting the results of an ongoing or future fracturing program and/or modifying the fracturing program, e.g., by adjusting the injection fluid compositions, flow rates, volumes, etc. as needed to achieve the desired fracturing results.

Block 606 may be implemented as indicated in FIG. 6B, starting in block 660 with assigning an orientation to each edge that connects to a boundary node. The orientations are set to provide a parameter of the type for which input parameter values are specified. The nodes on the other end of the newly oriented edges are added to a list of unfinished nodes. (Only nodes with at least one unoriented edge are added to the list.)

In block 662, the simulator module begins working through the list, one selected node at a time. A unoriented edge extending from the selected node in the list is assigned an orientation that provides the selected node with a parameter type complementary to that associated with the end of an oriented edge for that selected node. The node on the far end of the newly-oriented edge is added to the list of unfinished nodes, assuming it has at least one unoriented edge associated with it. The new node is preferably added at the beginning of the list, so that it will be the node that is first considered when the loop repeats. (This preferentially extends the list of nodes relative to the operation of assigning orientations to each edge from any given node.) If no unoriented edge extends from the selected node, the simulator module removes the selected node from the list in block 664.

In block 666, the simulator module determines if the list of unfinished nodes is empty, and if not, the loop (blocks 662-666) is repeated using the first node in the list. Otherwise, the loop concludes.

Figure 7:
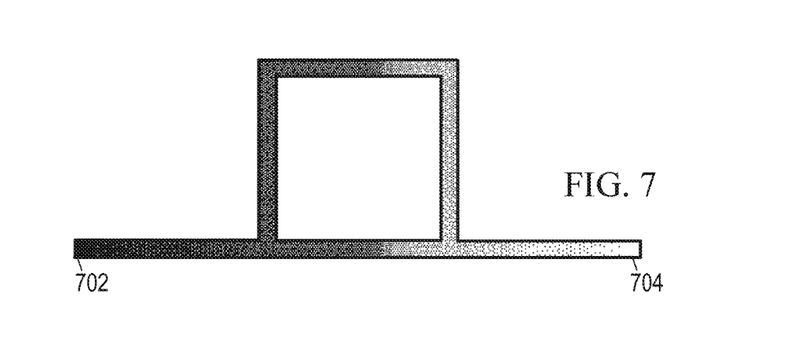
FIG. 7 is an illustrative spatial distribution of a flow parameter.

FIG. 7 shows an illustrative spatial distribution of pressure that was determined in accordance with the foregoing process as applied to the graph of FIG. 5A. The fluid flow emanates from a source 702 and flows to a sink 704, producing a gradual pressure drop along both paths. The associated flow rates along each fracture can be similarly determined.

In summary, the embodiments disclosed herein include:

A: A hydraulic fracturing flow simulation method that comprises: identifying a connected network of fractures; assigning an orientation to each fracture in the network to locate two different flow parameter types at each junction, thereby defining an arrangement of different flow parameter types spatially staggered along each fracture; capturing the arrangement as a set of linear equations for iteratively deriving a subsequent flow state from a current flow state; simulating flow through the network of fractures by repeatedly solving the set of linear equations; determining a time-dependent spatial distribution of at least one flow component; and displaying the time-dependent spatial distribution.

B: A hydraulic fracturing flow simulation system that comprises: a data acquisition module collecting measurements from a subterranean formation; a processing module implementing a hydraulic fracturing simulation; and a visualization module that displays a time-dependent spatial distribution. The method includes: modeling a connected network of fractures; assigning an orientation to each fracture in the network to locate two different flow parameter types at each junction, thereby defining an arrangement of different flow parameter types spatially staggered along each fracture; capturing the arrangement as a set of linear equations for iteratively deriving a subsequent flow state from a current flow state; simulating flow through the network of fractures by repeatedly solving the set of linear equations; and determining the time-dependent spatial distribution of at least one flow component.

Each of the embodiments A and B, may further include one or more of the following additional features in any combination: (1) a non-transitory computer-readable medium that stores the time-dependent spatial distribution. (2) The method further comprises storing the time-dependent spatial distribution on a non-transitory computer-readable medium. (3) The method further comprises modifying a fracturing program based on the time-dependent spatial distribution. (4) The flow parameter types comprise pressure and flow rate. (5) said assigning comprises, for each boundary or junction having a predetermined parameter type, giving a corresponding orientation to a fracture extending from that boundary or junction. (6) said assigning comprises for each boundary or junction having at least one fracture with an assigned orientation and at least one unoriented fracture, allocating a complementary orientation to the unoriented fracture. (7) said allocating is performed to preferentially increase a number of junctions having at least one fracture with an assigned orientation and at least one unoriented fracture. (8) The method further includes, after orientations have been assigned to all fractures in the network, identifying any junction that lacks two different parameter types and lengthening a representation of one fracture extending from each such junction.

Numerous variations and modifications will become apparent to those skilled in the art once the above disclosure is fully appreciated. The ensuing claims are intended to cover such variations where applicable.

What is claimed is:

1. A hydraulic fracturing flow simulation method that comprises:
    identifying a connected network of fractures and providing a representation of the network, wherein the network representation includes one or more boundary and one or more junction;
    assigning an orientation to each fracture in the network representation to locate two different flow parameter types at each junction, thereby defining an arrangement of different flow parameter types spatially staggered along each fracture;
    capturing the arrangement as a set of linear equations for iteratively deriving a subsequent flow state from a current flow state;
    simulating flow through the network of fractures by repeatedly solving the set of linear equations;
    determining a time-dependent spatial distribution of at least one flow component; and
    displaying the time-dependent spatial distribution.

2. The method of claim 1, further comprising storing the time-dependent spatial distribution on a non-transitory computer-readable medium.

3. The method of claim 1, further comprising modifying a fracturing program based on the time-dependent spatial distribution.

4. The method of claim 1, wherein the flow parameter types comprise pressure and flow rate.

5. The method of claim 1, wherein said assigning comprises, for each boundary or junction having a predetermined parameter type, giving a corresponding orientation to a fracture extending from that boundary or junction.

6. The method of claim 5, wherein said assigning further comprises for each boundary or junction having at least one fracture with an assigned orientation and at least one unoriented fracture, allocating a complementary orientation to the unoriented fracture.

7. The method of claim 6, wherein said allocating is performed to preferentially increase a number of junctions having at least one fracture with an assigned orientation and at least one unoriented fracture.

8. The method of claim 1, further comprising, after systematic orientations have been assigned to all fractures in the network representation, identifying any junction that lacks two different parameter types and lengthening a representation of one fracture extending from each such junction.

9. A hydraulic fracturing flow simulation system that comprises:
    a data acquisition module collecting measurements from a subterranean formation;
    a processing module implementing a hydraulic fracturing simulation method that includes:
        modeling a connected network of fractures and providing a representation of the network, wherein the network representation includes one or more junction and one or more boundary;
        assigning an orientation to each fracture in the network representation to locate two different flow parameter types at each junction, thereby defining an arrangement of different flow parameter types spatially staggered along each fracture;
        capturing the arrangement as a set of linear equations for iteratively deriving a subsequent flow state from a current flow state;
        simulating flow through the network of fractures by repeatedly solving the set of linear equations; and
        determining a time-dependent spatial distribution of at least one flow component; and
    a visualization module that displays the time-dependent spatial distribution.

10. The system of claim 9, further comprising a non-transitory computer-readable medium that stores the time-dependent spatial distribution.

11. The system of claim 9, wherein the method further comprises modifying a fracturing program based on the time-dependent spatial distribution.

12. The system of claim 9, wherein the flow parameter types comprise pressure and flow rate.

13. The system of claim 9, wherein said assigning comprises, for each boundary or junction having a predetermined parameter type, giving a corresponding orientation to a fracture extending from that boundary or junction.

14. The system of claim 13, wherein said assigning further comprises for each boundary or junction having at least one fracture with an assigned orientation and at least one unoriented fracture, allocating a complementary orientation to the unoriented fracture.

15. The system of claim 14, wherein said allocating is performed to preferentially increase a number of junctions having at least one fracture with an assigned orientation and at least one unoriented fracture.

16. The system of claim 9, wherein the method further comprises, after orientations have been assigned to all fractures in the network representation, identifying any junction that lacks two different parameter types and lengthening a representation of one fracture extending from each such junction.

* * * * *